Patented May 9, 1933

1,908,065

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

VULCANIZATION OF RUBBER

No Drawing.   Application filed August 29, 1928.   Serial No. 302,890.

The present invention relates to the vulcanization of rubber by an improved process wherein the products obtained by reacting a carbon disulfid derivative of a primary or secondary amine with a nitro or a nitro and halogen substituted derivative of a halogen phenyl mercaptan is employed as a vulcanization accelerator. The manufacture of the preferred class of accelerating compounds and their use in a rubber mix will be readily understood from the following description and examples.

The amine salts of alkyl-di-thiocarbamic acids, as are well known, are produced by the action of carbon disulfid on primary or secondary aliphatic amines and are accelerators of the vulcanization process. It has now been found that such amine salts or alkali salts of alkyl-di-thiocarbamic acids can be combined with a nitro substituted derivative of a halogen phenyl mercaptan to produce a stable compound having the general formula

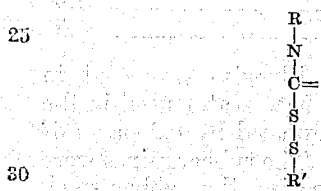

wherein R represents aliphatic hydrocarbon groups and R' represents a nitro substituted aryl group. Such compounds have been found to be active as accelerators of vulcanization when employed in a rubber mix and produce rubber products in a short period of time that possess high tensile strengths and other desirable characteristics required in commercial practice.

The compounds of the type comprising the subject-matter of the present invention are preferably manufactured according to the following example, although other modes of reacting the ingredients set forth as well as other analogous substances may be followed. Thus, one of the preferred type of compounds, the reaction product of piperidine pentamethylene dithiocarbamate and o-nitrophenyl chlormercaptan, was prepared by dissolving substantially two molar portions of piperidine (170 parts) in ethyl alcohol. To this alcoholic solution of piperidine approximately one molar portion of carbon disulfid (76 parts) was added slowly at room temperature. To the alcoholic solution of piperidine pentamethylene dithiocarbamate thus prepared, substantially one molar portion (190 parts) of o-nitrophenyl chlormercaptan was added thereto with agitation at a temperature of approximately 20 to 50° C. After the addition of the o-nitrophenyl chlormercaptan was completed, agitation was continued for about three hours at a temperature of substantially 20 to 50° C. The yellow solid formed, comprising the desired material, was filtered off, washed with alcohol and dried at about 50° C. This material, which is soluble in alcohol, benzene and chloroform, has a melting point of substantially 123.8 to 124.3° C. and is most probably formed from piperidine pentamethylene dithiocarbamate and o-nitrophenyl chlormercaptan according to the following equation:

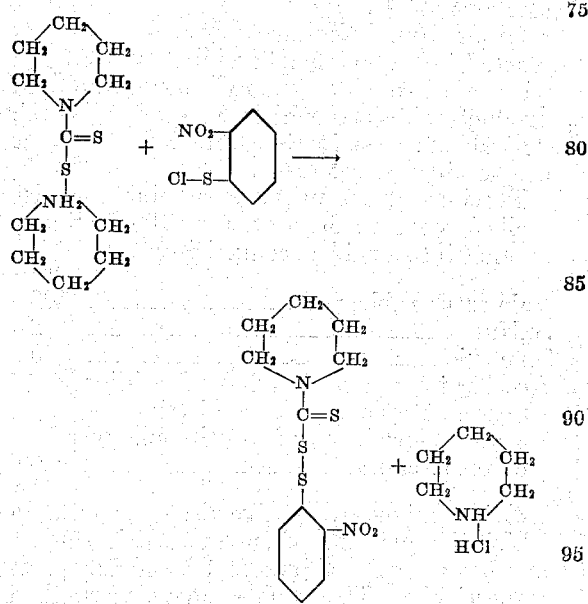

If prepared from the sodium salt of pentamethylene dithiocarbamic acid as hereinafter stated, the formation of the desired material most probably takes place according to the following equation:

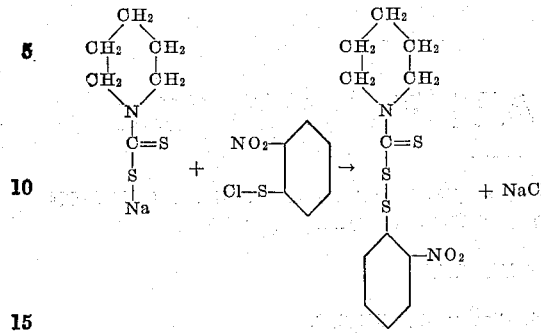

As another method of preparing the above compound, instead of the piperidine salt of pentamethylene dithiocarbamic acid, the sodium salt of pentamethylene dithiocarbamac acid was reacted with o-nitrophenyl chlormercaptan in the following manner.

Approximately one molar portion of sodium hydroxide (40 parts) was dissolved in about 1200 parts of ethyl alcohol. Approximately one molar portion of piperidine (85 parts) was added thereto and then substantially one molar portion of carbon disulfid (76 parts) was added at room temperature. To the sodium salt of pentamethylene dithiocarbamic acid thus formed, approximately one molar portion of o-nitrophenyl chlormercaptan (190 parts) was added at about 50° C. After the addition of the o-nitrophenyl chlormercaptan was completed, the reaction mixture was stirred for an additional period of about four hours at approximately 50° C. The reaction product was then filtered off, washed with water to eliminate the sodium chloride formed as a by-product, and dried at about 50° C.

Other alkyl-dithiocarbamic acids have been reacted in the manner hereinbefore set forth with a nitro chlor phenyl mercaptan and products obtained which were found to be desirable for use in the preferred process as are hereinafter set forth.

Portions of the products hereinbefore described were incorporated in the ordinary manner into a rubber comprising

| | Parts |
|---|---|
| Pale crepe rubber | 100 |
| Sulfur | 2 |
| Zinc oxide | 5 |
| Accelerator, that is the piperidine pentamethylene dithiocarbamic reaction product of o-nitrophenyl chlormercaptan | 0.5 |

Other mixes were likewise prepared in which the quantity of sulfur used in the example was replaced by 1.75, 1.5 and 2.25 parts respectively. The rubber mixes were then vulcanized by heating the rubber stocks in a press for the times and at the pressure conditions indicated in the following table in which are set forth the physical characteristics of the cured rubber stocks.

| Parts sulfur | Time of cure | Modulus of elasticity at elongation of | | | Tensile in lbs/in² at break | % Ultimate elongation |
|---|---|---|---|---|---|---|
| | | 300% | 500% | 700% | | |
| 2 | 5 min. at 40 lbs. steam pressure | 153 | 276 | 862 | 2025 | 850 |
| 1.75 | | 153 | 273 | 781 | 2175 | 880 |
| 1.5 | | 122 | 207 | 601 | 1965 | 913 |
| 2.25 | | 153 | 309 | 1015 | 2540 | 860 |
| 2.0 | 15 min. at 40 lbs. steam pressure | 229 | 507 | 1850 | 3040 | 795 |
| 1.75 | | 201 | 421 | 1520 | 2720 | 803 |
| 1.5 | | 196 | 394 | 1335 | 2825 | 825 |
| 2.25 | | 245 | 568 | 2060 | 3590 | 800 |
| 2.0 | 30 min. at 40 lbs. steam pressure | 211 | 858 | 1615 | 3035 | 810 |
| 1.75 | | 190 | 374 | 1210 | 2555 | 820 |
| 1.5 | | 163 | 326 | 979 | 2540 | 800 |
| 2.25 | | 244 | 534 | 1900 | 3435 | 803 |
| 2.0 | 45 min. at 40 lbs. steam pressure | 187 | 392 | 1260 | 2435 | 820 |
| 1.75 | | 167 | 338 | 996 | 2240 | 825 |
| 1.5 | | 156 | 310 | 870 | 2310 | 863 |
| 2.25 | | 225 | 476 | 1715 | 3480 | 835 |

Tests with other samples of the same rubber mix have shown that a fully cured product is obtained at lower temperatures by heating the stocks in a press maintained under lower steam pressures for slightly longer periods than are set forth above.

The reaction product of the piperidine salt of pentamethylene dithiocarbamic and o-nitrophenyl chlormercaptan has also been tested in a rubber formula typical of a commercial tread stock. Such a compound comprises

| | Parts |
|---|---|
| Smoked sheet rubber | 27.85 |
| Pale crepe rubber | 26.15 |
| Zinc oxide | 15.0 |
| Carbon black | 25.0 |
| Mineral rubber | 4.0 |
| A blended mineral oil and rosin | 1.0 |
| Stearic acid | 1.0 |
| Sulfur | 1.9 |
| Accelerator | .5 |

Other mixes were likewise prepared in which the quantity of accelerator used in the above example was replaced by 0.2 parts of the same accelerator. The rubber mixes were then vulcanized by heating the rubber stock in a press for the times and at the pressure conditions indicated in the table.

| Parts accelerator | Time of cure | Modulus of elasticity at elongations of | | Tensile in lbs/in² at break | Ultimate elongation |
|---|---|---|---|---|---|
| | | 300% | 500% | | |
| 0.5 | 5 min. at 40 lbs. steam pressure | 649 | 1600 | 2675 | 680 |
| 0.2 | | 341 | -------- | 774 | 480 |
| 0.5 | 15 min. at 40 lbs. steam pressure | 1360 | 3040 | 3780 | 610 |
| 0.2 | | 751 | 1785 | 2850 | 660 |
| 0.5 | 30 min. at 40 lbs. steam pressure | 1380 | 3420 | 3755 | 550 |
| 0.2 | | 866 | 2080 | 3200 | 650 |
| 0.5 | 45 min. at 40 lbs. steam pressure | 1590 | 3400 | 3705 | 540 |
| 0.2 | | 962 | 2300 | 3370 | 650 |
| 0.5 | 60 min. at 40 lbs. steam pressure | 1615 | 3380 | 3710 | 550 |
| 0.2 | | 990 | 2365 | 3285 | 610 |
| 0.5 | 120 min. at 40 lbs. steam pressure | 1335 | 2880 | 3010 | 550 |
| 0.2 | | 1055 | 2440 | 2930 | 655 |

| Parts accelerator | Time of cure | Modulus of elasticity at elongations of | | Tensile in lbs/in² at break | Ultimate elongation |
|---|---|---|---|---|---|
| | | 300% | 500% | | |
| 0.5 | 20 min. at 20 lbs. steam pressure | 1075 | 2490 | 3775 | 690 |
| 0.2 | | 539 | 1330 | 2425 | 680 |
| 0.5 | 40 min. at 20 lbs. steam pressure | 1475 | 3255 | 4018 | 600 |
| 0.2 | | 760 | 1920 | 3175 | 680 |
| 0.5 | 60 min. at 20 lbs. steam pressure | 1670 | 3465 | 3965 | 560 |
| 0.2 | | 883 | 2120 | 3365 | 690 |
| 0.5 | 30 min. at 10 lbs. steam pressure | 609 | 1525 | 2625 | 700 |
| 0.2 | | 224 | | 559 | 490 |
| 0.5 | 60 min. at 10 lbs. steam pressure | 1235 | 2875 | 4040 | 680 |
| 0.2 | | 638 | 1590 | 2860 | 690 |
| 0.5 | 120 min. at 10 lbs. steam pressure | 1850 | 3710 | 4000 | 540 |
| 0.2 | | 927 | 2245 | 3480 | 670 |
| 0.5 | 180 min. at 10 lbs. steam pressure | 1980 | 3860 | 3960 | 523 |
| 0.2 | | 1100 | 2480 | 3650 | 620 |

Another of the preferred class of compounds, for example the reaction product of o-nitrophenyl chlormercaptan and diethyl amine diethyl dithiocarbamate, was prepared in an analogous manner to the reaction product of o-nitrophenyl chlormercaptan and piperidine pentamethylene dithiocarbamate hereinbefore mentioned.

A sample of this material was incorporated in the usual manner in a rubber mix comprising

| | Parts |
|---|---|
| Pale crepe rubber | 100 |
| Sulfur | 2 |
| Zinc oxide | 5 |
| Accelerator | 0.5 |

Similar mixes were prepared in which 0.4 and 0.3 parts respectively of the same accelerator were incorporated therein. The rubber mixes were then vulcanized by heating the rubber stock in a press for the periods of time and pressures as indicated in the following table.

| Parts accelerator | Time of cure | Modulus of elasticity at elongations of | | | Tensile in lbs/in² at break | Ultimate elongation |
|---|---|---|---|---|---|---|
| | | 300% | 500% | 700% | | |
| 0.5 | 60 min. at 10 lbs. steam pressure | 159 | 311 | 1013 | 2870 | 890 |
| 0.4 | | 124 | 233 | 649 | 2330 | 940 |
| 0.3 | | 130 | 216 | 627 | 2170 | 938 |
| 0.5 | 30 min. at 20 lbs. steam pressure | 169 | 358 | 1205 | 2670 | 838 |
| 0.4 | | 130 | 278 | 780 | 2410 | 910 |
| 0.3 | | 126 | 208 | 577 | 1930 | 930 |
| 0.5 | 60 min. at 20 lbs. steam pressure | 216 | 491 | 1640 | 3200 | 813 |
| 0.4 | | 201 | 422 | 1410 | 3355 | 850 |
| 0.3 | | 185 | 371 | 1240 | 2865 | 850 |
| 0.5 | 15 min. at 40 lbs. steam pressure | 201 | 398 | 1355 | 2850 | 835 |
| 0.4 | | 171 | 334 | 1060 | 2790 | 868 |
| 0.3 | | 149 | 285 | 872 | 2405 | 888 |
| 0.5 | 30 min. at 40 lbs. steam pressure | 199 | 400 | 1170 | 2720 | 845 |
| 0.4 | | 188 | 359 | 1040 | 2910 | 878 |
| 0.3 | | 182 | 318 | 950 | 2445 | 863 |

Other examples of the preferred class of compounds, for example, the reaction product of dinitro-phenyl chlormercaptan and piperidine pentamethylene dithiocarbamate and the reaction product of chlor-nitrophenyl chlormercaptan and normal dibutyl amine dibutyl dithiocarbamate were incorporated in a rubber mix comprising

| | Parts |
|---|---|
| Pale crepe rubber | 100 |
| Zinc oxide | 5 |
| Sulfur | 3.5 |
| Accelerator | .3 |

The rubber mixes thus obtained were vulcanized by heating in a press for different periods of time at different temperatures. The following table shows the results of the tensile tests obtained from sheets of rubber thus vulcanized. In the table, the reaction product of dinitrophenyl chlormercaptan and piperidine pentamethylene dithiocarbamate is designated as accelerator "A", while the reaction product of chlor-nitrophenyl chlormercaptan and normal dibutyl amine-dibutyl dithiocarbamate is designated as accelerator "B".

| Accelerator | Time of cure min. | Pressure lbs. steam | Modulus of elasticity in lbs/in² at elongations of | | | Tensile at break | Elongation at break % |
|---|---|---|---|---|---|---|---|
| | | | 300% | 500% | 700% | | |
| A | 30 | 10 | 123 | 265 | 856 | 2200 | 890 |
| B | 30 | 10 | 123 | 191 | 400 | 1345 | 970 |
| A | 60 | 10 | 228 | 470 | 1545 | 3000 | 830 |
| B | 60 | 10 | 196 | 383 | 1265 | 2845 | 860 |
| A | 30 | 20 | 186 | 364 | 1120 | 2410 | 833 |
| B | 30 | 20 | 162 | 309 | 890 | 2280 | 870 |
| A | 60 | 20 | 210 | 432 | 1455 | 3035 | 825 |
| B | 60 | 20 | 225 | 483 | 1700 | 3255 | 815 |
| A | 15 | 40 | 178 | 368 | 1045 | 2580 | 860 |
| B | 15 | 40 | 165 | 356 | 1065 | 2520 | 850 |
| A | 30 | 40 | 176 | 396 | 1115 | 2635 | 860 |
| B | 30 | 40 | 243 | 514 | 1570 | 3095 | 815 |
| A | 45 | 40 | 191 | 400 | 1060 | 2715 | 860 |
| B | 45 | 40 | 231 | 539 | 1675 | 3090 | 800 |

Nitro substituted derivatives of halogen phenyl mercaptans react with compounds other than the salts of alkyl dithiocarbamic acid to form an important group of compounds.

Other examples of the use of the preferred accelerators in the rubber vulcanization process are apparent to those skilled in the art. It is to be understood that different ingredients and different proportions of ingredients from those particularly set forth in the examples may be employed.

What is claimed is:

1. The process of manufacturing vulcanized rubber which comprises combining with rubber a vulcanizing agent in the presence of an accelerating compound formed by reacting a carbon disulfid derivative of a secondary aliphatic amine with a nitro substituted derivative of a halogen phenyl mercaptan compound free of aromatic acyl substituents.

2. The process of manufacturing vulcanized rubber which comprises combining with rubber a vulcanizing agent in the presence of an accelerating compound formed by reacting a carbon disulfid derivative of a secondary aliphatic amine with a nitro substituted derivative of a chlor phenyl mercaptan free of aromatic acyl substituents.

3. The process of manufacturing vulcanized rubber which comprises combining with rubber a vulcanizing agent in the presence of an accelerating compound formed by reacting a carbon disulfid derivative of a secondary aliphatic amine with o-nitrophenylchlormercaptan.

4. The process of manufacturing vulcanized rubber which comprises combining with rubber a vulcanizing agent in the presence of an accelerating compound formed by reacting an amine salt of an alkyl substituted dithiocarbamic acid with o-nitrophenyl chlormercaptan.

5. The process of manufacturing vulcanized rubber which comprises combining with rubber a vulcanizing agent in the presence of an accelerating compound formed by reacting piperidine pentamethylene dithiocarbamate with o-nitrophenyl chlormercaptan.

6. The process of manufacturing vulcanized rubber which comprises combining with rubber a vulcanizing agent in the presence of an accelerating compound formed by reacting substantially equi-molar portions of piperidine pentamethylene dithiocarbamate and o-nitrophenyl chlormercaptan.

7. The vulcanized rubber product obtained by treating rubber with a vulcanizing agent in the presence of an accelerator, said accelerator comprising the reaction product of a carbon disulfid derivative of an aliphatic amine with a nitro substituted derivative of a halogen phenyl mercaptan free of acyl substituents.

8. The vulcanized rubber product obtained by treating rubber with a vulcanizing agent in the presence of an accelerator, said accelerator comprising the reaction product of a carbon disulfid derivative of a secondary aliphatic amine with a nitro substituted derivative of a halogen phenyl mercaptan compound free of aromatic acyl substituents.

9. The vulcanized rubber product obtained by treating rubber with a vulcanizing agent in the presence of an accelerator comprising the reaction product of a carbon disulfid derivative of a secondary aliphatic amine with a nitro substituted derivative of a chlor-phenyl mercaptan free of aromatic acyl substituents.

10. The vulcanized rubber product obtained by treating rubber with a vulcanizing agent in the presence of an accelerator, said accelerator comprising the reaction product of a carbon disulfid derivative of a secondary aliphatic amine with o-nitrophenyl chlormercaptan.

11. The vulcanized rubber product obtained by treating rubber with a vulcanizing agent in the presence of an accelerating compound formed by reacting an amine salt of an alkyl substituted dithiocarbamic acid with o-nitrophenyl chlormercaptan.

12. The vulcanized rubber product obtained by treating rubber with a vulcanizing agent in the presence of an accelerating compound formed by reacting piperidine pentamethylene dithiocarbamate with o-nitrophenyl chlormercaptan.

13. The vulcanized rubber product obtained by treating rubber with a vulcanizing agent in the presence of an accelerating compound formed by reacting substantially equi-molar portions of piperidine pentamethylene dithiocarbamate and o-nitrophenyl chlormercaptan.

14. The process of manufacturing vulcanizing rubber which comprises combining with rubber a vulcanizing agent in the presence of an accelerating compound formed by reacting a salt of a dialkyl substituted dithiocarbamic acid with o-nitrophenyl chlormercaptan.

15. The vucanized rubber product obtained by treating rubber with a vulcanizing agent in the presence of an accelerator, said accelerator comprising the reaction product of a salt of a dialkyl substituted dithiocarbamic acid with o-nitrophenyl chlormercaptan.

16. The process of manufacturing vulcanized rubber which comprises combining with rubber a vulcanizing agent in the presence of an accelerating compound formed by reacting a salt of an akyl substituted dithiocarbamic acid with a nitro substituted derivative of a halogen phenyl mercaptan compound free of other substituents.

17. The vulcanized rubber product obtained by treating rubber with a vulcanizing agent in the presence of an accelerator, said accelerator comprising the reaction product of a salt of an alkyl substituted dithiocarbamic acid with a nitro substituted derivative of a halogen phenyl mercaptan compound free of other substituents.

In testimony whereof I hereunto affix my signature.

WINFIELD SCOTT.